United States Patent
Trim et al.

(10) Patent No.: US 10,430,466 B2
(45) Date of Patent: Oct. 1, 2019

(54) STREAMLINING SUPPORT DIALOGUES VIA TRANSITIVE RELATIONSHIPS BETWEEN DIFFERENT DIALOGUES

(71) Applicant: INTERNATIONAL BUSINESS MACHINES CORPORATION, Armonk, NY (US)

(72) Inventors: Craig M. Trim, Sylmar, CA (US); John M. Ganci, Jr., Cary, NC (US); Wing L. Leung, Austin, TX (US); Kimberly G. Starks, Nashiville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/879,734

(22) Filed: Jan. 25, 2018

(65) Prior Publication Data
US 2019/0228107 A1 Jul. 25, 2019

(51) Int. Cl.
*G06F 16/9032* (2019.01)
*G06F 17/21* (2006.01)
*G06F 17/27* (2006.01)
*H04L 12/58* (2006.01)

(52) U.S. Cl.
CPC ........ *G06F 16/90332* (2019.01); *G06F 17/21* (2013.01); *G06F 17/27* (2013.01); *H04L 51/02* (2013.01)

(58) Field of Classification Search
CPC .... G06F 17/30976; G06F 17/21; G06F 17/27; H04L 51/02
USPC ................................................................. 704/9
See application file for complete search history.

(56) References Cited

U.S. PATENT DOCUMENTS

| | | | |
|---|---|---|---|
| 9,378,202 B2 | 6/2016 | Larcheveque et al. | |
| 9,710,463 B2 | 7/2017 | Prasad et al. | |
| 2008/0040314 A1 | 2/2008 | Brave et al. | |
| 2014/0012798 A1 | 1/2014 | Visel | |
| 2015/0095033 A1* | 4/2015 | Boies | G10L 15/1815 704/257 |
| 2018/0068658 A1* | 3/2018 | Lehman | G06F 17/279 |

(Continued)

FOREIGN PATENT DOCUMENTS

WO 2013162652 10/2013

OTHER PUBLICATIONS

Mell et al., "The NIST Definition of Cloud Computing", NIST, Special Publication 800-145, Sep. 2011, 7 pages.

(Continued)

*Primary Examiner* — Quynh H Nguyen
(74) *Attorney, Agent, or Firm* — Christopher McLane; Andrew D. Wright; Roberts Mlotkowski Safran Cole & Calderon, P.C.

(57) ABSTRACT

A computer-implemented method includes storing, by a computing device, a plurality of dialogs between user devices and an automated support application hosted by the computing device; determining, by the computing device, transitive relationships between the plurality of dialogs; and updating, by the computing device, a question mapping based on the determining the transitive relationships; and applying, the computing device, the updated question mapping to a subsequent support dialog.

17 Claims, 9 Drawing Sheets

(56) References Cited

U.S. PATENT DOCUMENTS

2018/0137854 A1* 5/2018 Perez .................. G10L 15/063

OTHER PUBLICATIONS

Incremental Dialogue Processing, http://projects.ict.usc.edu/nld/cs599s13/LectureNotes/cs599s13dialogue3-13-13incremental.pdf, Mar. 13, 2013, 29 pages.
Bhargava et al., "Easy Contextual Intent Prediction and Slot Detection", 2013 IEEE International Conference, 2013, 5 pages.
Bikel et al., "Event Matching Using the Transitive Closure of Dependency Relations", Proceedings of ACL-08: HLT, Short Papers (Companion Volume), pp. 145-148, Jun. 2008, 4 pages.
Transitive closure, Wikipedia, https://en.wikipedia.org/wiki/Transitive_closure, accessed Jan. 23, 2018, 4 pages.
Video of IP Soft's Amelia, http://gartner.mediasite.com//Mediasite/Play/97592783dab746279f65898c313046c51d, Accessed Jan. 23, 2018, 1 page.
"Transitive closure of a graph", http://www.geeksforgeeks.org/transitive-closure-of-a-graph, GeeksforGeeks, accessed Jan. 25, 2018, 13 pages.
List of IBM Patents or Patent Applications Treated as Related, dated Aug. 2, 2019, 1 page.
Specification "Streamlining Support Dialogues Via Transitive Relationships Between Different Dialogues" and drawings in related U.S. Appl. No. 16/527,340, filed Jul. 31, 2019, 51 pages.

* cited by examiner

STREAMLINING SUPPORT DIALOGUES VIA TRANSITIVE RELATIONSHIPS BETWEEN DIFFERENT DIALOGUES

BACKGROUND

The present invention generally relates to streamlining support dialogues and, more particularly, to streamlining support dialogues via transitive relationships between different dialogues.

A user may interact with a virtual support agent (e.g., a chat bot, automated support agent, or the like) to obtain information or assistance for a technical issue (e.g., to reset a password, make changes to a service account, etc.). A virtual support agent (referred to as an "agent") and a user may engage in a dialogue in which the agent asks questions to determine the user's issues and provide the user with a solution. The user's intent when providing responses to an agent's questions can be determined using natural language processing based on a "first phrase" included in the user's first responses to agent questions, but may change throughout the dialogue.

SUMMARY

In an aspect of the invention, a computer-implemented method includes storing, by a computing device, a plurality of dialogues between user devices and an automated support application hosted by the computing device; determining, by the computing device, transitive relationships between the plurality of dialogues; and updating, by the computing device, a question mapping based on the determining the transitive relationships; and applying, the computing device, the updated question mapping to a subsequent support dialogue.

In an aspect of the invention, there is a computer program product for streamlining support dialogues, the computer program product comprising a computer readable storage medium having program instructions embodied therewith. The program instructions are executable by a computing device to cause the computing device to: receive, via an automated support application hosted by the computing device, an initial user input from a user via a user device; provide one or more follow-up questions based on receiving the initial user input and a question mapping; receive one or more follow-up responses to the one or more follow-up questions; store a dialogue, wherein the dialogue includes the initial user input, the one or more follow-up questions, and the one or more follow-up responses; determine a transitive relationship between the stored dialogue and one or more previously stored dialogues; update the question mapping based on the determining the transitive relationships; and apply the updated question mapping to a subsequent support dialogue.

In an aspect of the invention, a system includes: a CPU, a computer readable memory and a computer readable storage medium associated with a computing device; program instructions to store a plurality of dialogues between user devices and an automated support application hosted by the computing device; program instructions to determine transitive relationships between the plurality of dialogues; and program instructions to merge and abridge text transcripts of a subset of the plurality of dialogues that are transiently related to form an abridged text transcript; and program instructions to apply the abridged text transcript to a subsequent support dialogue. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
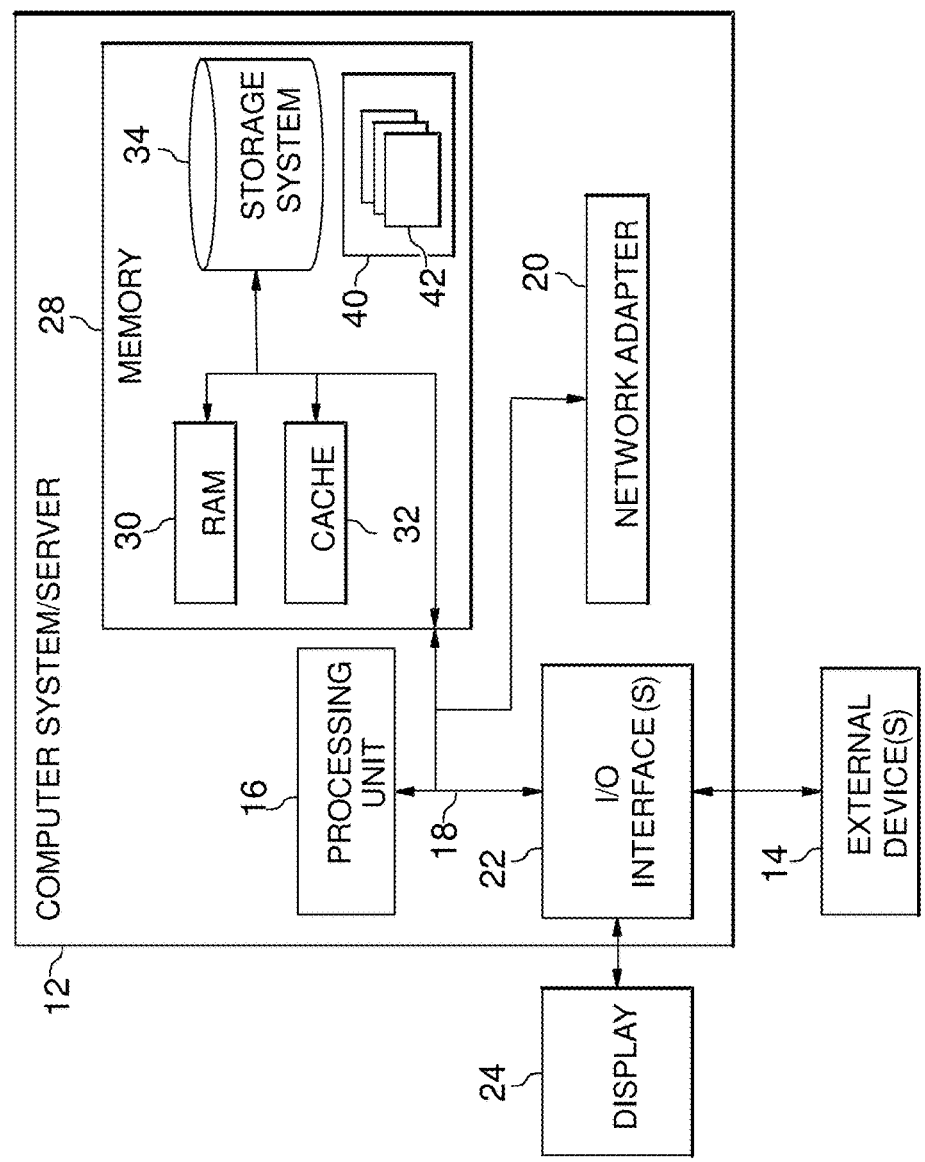
FIG. 1 depicts a cloud computing node according to an embodiment of the present invention.

The present invention generally relates to streamlining support dialogues and, more particularly, to streamlining support dialogues via transitive relationships between different dialogues. A virtual support agent (referred to as an "agent") and a user may engage in a dialogue in which the agent asks questions to determine the user's support issues with an application, or other computer-related system, and provide the user with a solution. The user's intent when providing responses to an agent's questions can be determined using natural language processing based on a "first phrase" included in the user's first responses to agent questions, but may change throughout the dialogue. Also, the user may not know the specific issue with which he or she needs assistance, and thus may engage in a "back and forth" with the agent to arrive at a solution. Further, the agent may misclassify the dialogue based on an initial classification that is determined from an initial user utterance (e.g., "first phrase"). When an entire dialogue is misclassified, the agent may not provide the needed information to assist the user in resolving an issue, or may end up asking the user a series of extraneous questions that waste the user's time in seeking resolution to the issue.

Accordingly, aspects of the present invention may track transitive relationships between different dialogues between users and agents, and use the transitive relationships to streamline future dialogues between users and agents and better identify the user's intent based on their responses to agent questions. More specifically, aspects of the present invention may eliminate sections or lines of questions of a dialogue that do not lead to resolving the user's issue. In embodiments, aspects of the present invention may "match" or compare dialogues that are similar, and may use these comparisons to determine transitive relationships between the dialogues. For example, each agent query and user response may be a "node" in a dialogue graph, and comparison of dialogue graphs and transcripts may be used to identify transitive relationships between the nodes in the dialogue. As such, the shortest "path" from one node (e.g., a first phrase or first response to an agent query) to a final node (e.g., a resolution of an issue) can be determined. In this way, the amount of time spent with an agent and the number of questions presented and answered is minimized. Further, the intent of the user for a new dialogue is more accurately determined based on comparing historical similar dialogues to identify the transitive relationship between a new dialogue and historical dialogues.

Aspects of the present invention may also generate and present dialogue maps/graphs for informational purposes and/or metrics tracking. The dialogue maps may also be used to determine transitive relationships between dialogues, and may also be used to analyze the operations and effectiveness of an agent. For example, if a dialogue map includes a relatively large number of questions and reclassifications, a determination can be made that the dialogue was relatively ineffective and convoluted so that adjustments to the agent's question mappings can be adjusted. In embodiments, the dialogue map may identify agent questions, user responses, and classifications of the user responses (e.g., as determined using natural language classification/processing). In this way, comparison of multiple dialogue maps may be used to identify the "shortest path" between a particular initial user utterance, and a final classification/intent of the user based on the initial utterance.

Aspects of the present invention may improve the functioning of computer-based automated support agents by reducing the computing resources used by automated support applications hosted by agent servers. For example, since the number of questions and overall length of dialogues is reduced using the systems and/or methods described herein, the amount of computing resources consumed for resolving support issues is reduced. Further, computing capacity for other applications or to serve additional users is increased since the computing resources used for each support dialogue is reduced. In turn, the speed, performance, and capacity of computing resources are improved. Further, aspects of the present invention may collect hundreds or potentially thousands of dialogues over a period of time to update, streamline, and shorten the length of interactions between a user and an agent device for resolving a support issue. As such, aspects of the present invention cannot be done with pen and paper. Further, aspects of the present invention produce a specific result of reducing the length of a dialogue and improving dialogue accuracy, leading to an improvement in customer satisfaction, and reducing costs for service providers when providing support services to customers. In other words, aspects of the present invention update automated chat algorithms, processes, and question maps with the specific purpose, benefit, and result of reducing the length of a dialogue and improving dialogue accuracy, rather than merely displaying results of analyzed data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
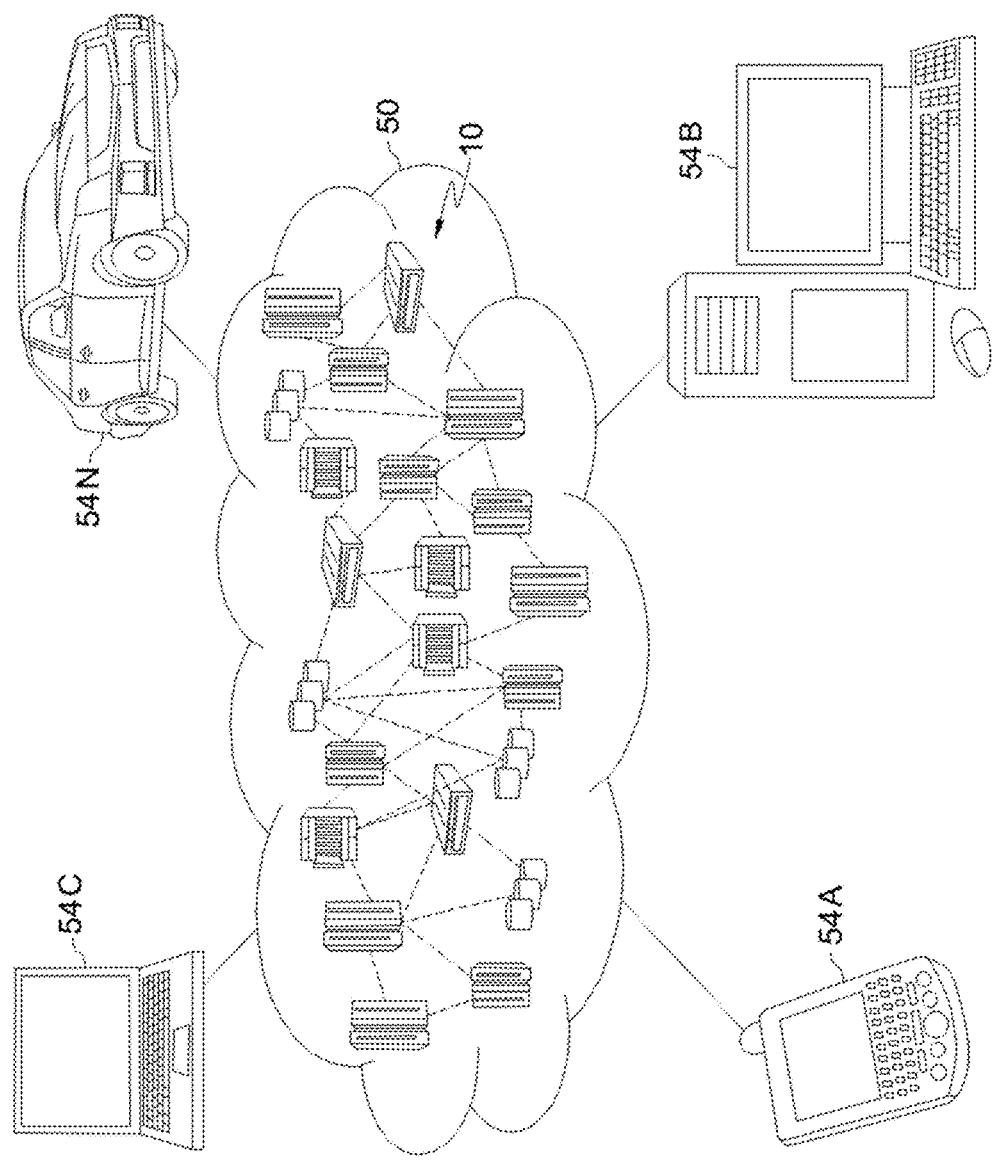
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
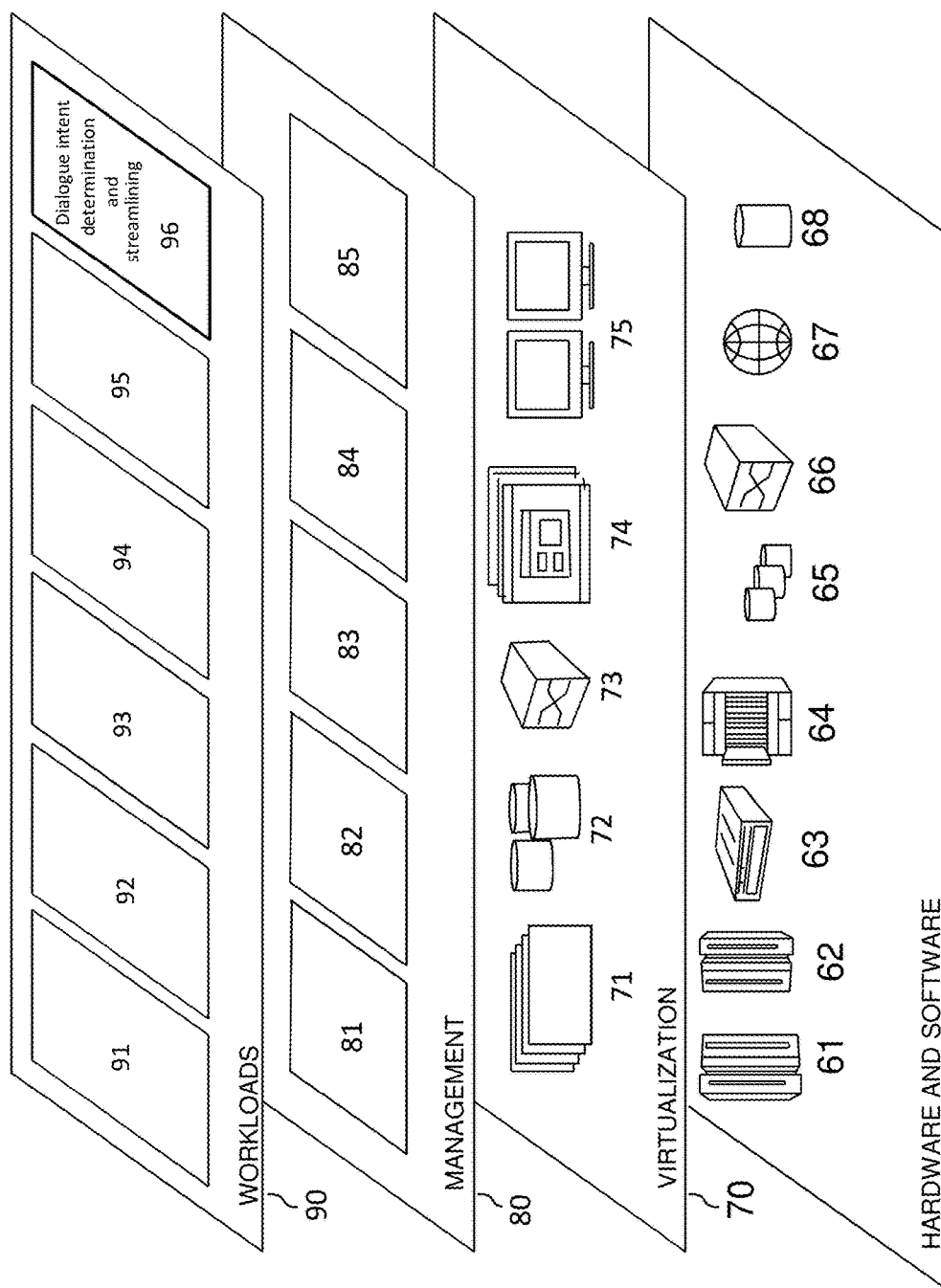
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dialogue intent determination and streamlining 96.

Referring back to FIG. 1, the program/utility 40 may include one or more program modules 42 that generally carry out the functions and/or methodologies of embodiments of the invention as described herein (e.g., such as the functionality provided by dialogue intent determination and streamlining 96). Specifically, the program modules 42 may receive a user query as part of a dialogue with an agent, determine a classification for the query, provide follow-up questions to confirm the classification, score responses to the follow-up questions, compare the dialogue with other dialogues to determine transitive relationships, and refine/update question mappings based on the transitive relationships to streamline future dialogues between users and the agent. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an agent device as shown in FIG. 4A.

Figure 4A:
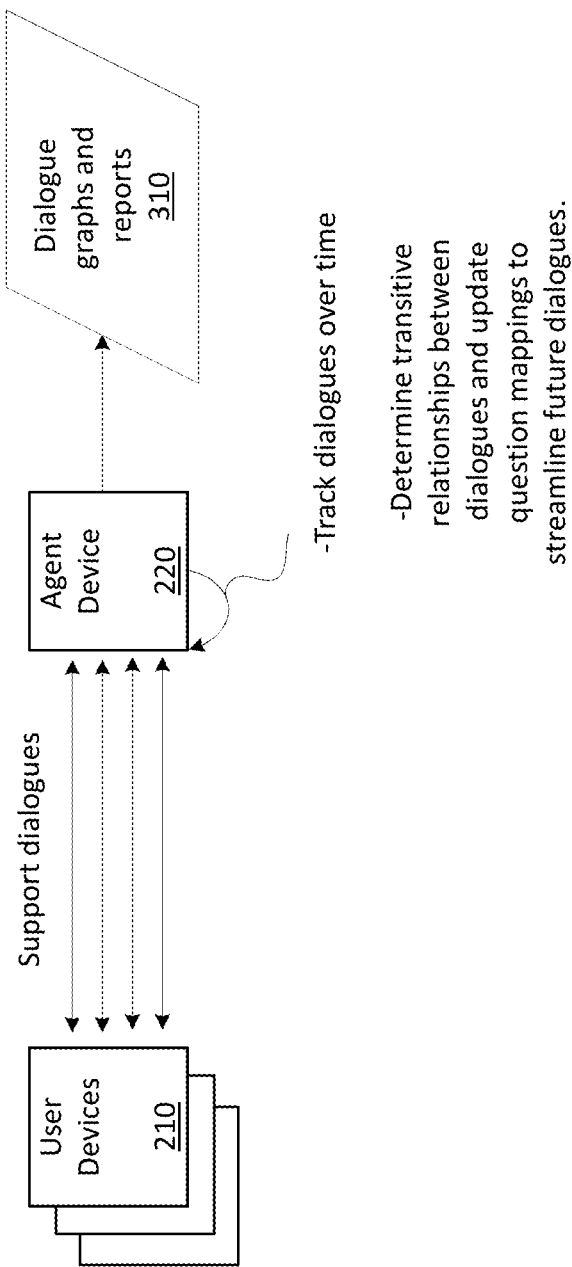
FIGS. 4A and 4B show an overview of an example implementation in accordance with aspects of the present invention.
Figure 4B:
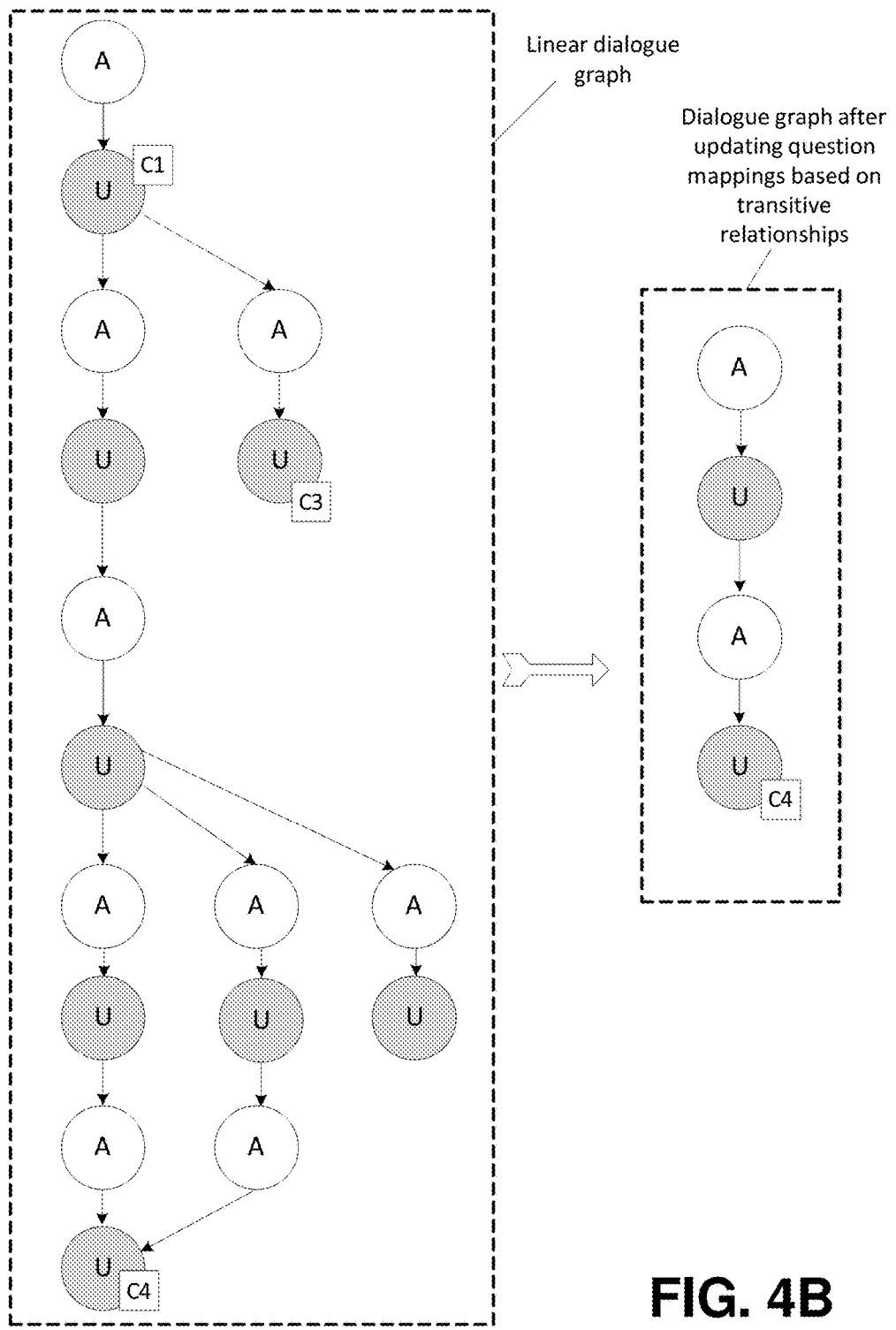

FIGS. 4A and 4B shows an overview of an example implementation in accordance with aspects of the present invention. In FIG. 4A, an agent device 220 may include one or more computing devices (e.g., servers) that provide automated support assistance to users through user devices 210. For example, a user may use a user device 210 to access an automated support application or service hosted by the agent device 220. The user device 210 and the agent device 220 may conduct a "dialogue" in which the user device 210 provides user inputs relating to obtaining support for a technical issue (e.g., to reset a password, obtain technical information for a product or application, troubleshoot a product or application, etc.). The agent device 220 may use natural language processing to recognize user inputs made by the user and received from user device 210, ask a series of follow-up questions to better classify and/or determine the intent of the user's inputs, and provide the user with a resolution to their support issue based on determining the intent of the user's inputs.

While certain support issues may seem relatively simple (e.g., a password reset request), in practice, the support issue may be more complex, leading to the need for a relatively long dialogue between the user device 210 and the agent device 220 to arrive at solution to a user's support issue. For example, a password reset issue could relate to a multitude of possible support issues, such as trouble authenticating past a hard-drive encryption log-in screen for a computer, authenticating past a log-in screen for an operating system, authenticating to access a secure network drive or database, authenticating to access an application, etc. Thus, if a user provides user input to the agent device 220 indicating that the user is having password issues, the specific issue may not be known based on the user's initial query, "first phrase" or "utterance." Accordingly, the agent device 220 may ask a series of follow-up questions to properly classify the dialogue and provide resolution.

During a dialogue, the agent device 220 may use a question map to better identify the user's specific support issue and provide proper resolution. For example, the agent device 220 may ask a series of follow-up questions based on user inputs, in which the follow-up questions are based on a question map. The agent device 220 may classify the dialogue such that information for resolving the user's issue can be provided to the user device 210 based on the classification. If a dialogue is not initially classified correctly (e.g., based on user input indicating that information provided to the user does not resolve the user's issue), additional follow-up questions may be asked by the agent device 220 so that the dialogue may be reclassified. In certain situations, a dialogue may be reclassified multiple times in the event that the agent device 220 is unable to initially classify a dialogue correctly, and the dialogue may be reclassified until the correct classification is confirmed by the user.

Accordingly, and as shown in FIG. 4A, aspects of the present invention may track dialogues with multiple different users and user devices 210 over a period of time. More specifically, the agent device 220 may track user inputs/queries, agent responses to those queries, classifications made throughout the dialogues, user responses to queries made by the agent device 220, etc., to determine transitive relationships between the dialogues. Further, the agent device 220 may update question mappings to streamline future dialogues based on the transitive relationships. For example, the agent device 220 may determine intent behind certain user inputs, questions, and responses by determining transitive relationships between different dialogues. The transitive relationships may then be used to update question mappings and determine the relevant steps and questions asked by the agent device 220 to arrive at a resolution to the user's support issue, while eliminating the non-relevant questions that do not lead to a resolution. In this way, future dialogues may be streamlined and shortened by leveraging the determined transitive relationships, and the accuracy of dialogue classification may be improved. As further shown in FIG. 4A, the agent device 220 may optionally output dialogue graphs and reports 310 that visually display a dialogue in a linear graph format.

In embodiments, the agent device 220 may generate linear dialogue graphs of each dialogue in order to determine the transitive relationships. With reference to FIG. 4B, each dialogue graph may identify "nodes" in which each node is a communication from the agent device 220 (denoted by "A") and from the user (denoted by "U"). The dialogue graph may show the path of the dialogue from start to finish, as well as classifications made at various nodes throughout the dialogue (denoted by "C1" C3", and "C4"). For example, as described above, the dialogue may be reclassified multiple times until a correct classification is confirmed by the user. In the example shown in FIG. 4B, the dialogue may be classified as "C1", reclassified to "C3", and reclassified again to "C4" (e.g., when the user indicates that the support issue is not related to "C1" or "C3", but confirms that the support issue is related to "C4").

The path may include a series of tangential questions that are asked by the agent device 220 and responded to by the user via the user device 210. The series of questions asked by the agent device 220 may be based on a question map that maps questions to user responses as determined by natural language processing. While not shown in FIG. 4B, the dialogue graphs may be associated with transcripts of the dialogue (e.g., user conversation inputs, agent responses, etc.). As described herein, the dialogue graph and transcripts may be compared and matched with other similar dialogues (e.g. dialogues in which a same classification was present at some point during the dialogue). By matching the dialogues, transitive relationships between the dialogues (and more specifically, between different nodes, questions, and responses within the dialogue) can be determined. As further shown in FIG. 4B, an updated dialogue graph may be generated in which the series of questions have been reduced to more quickly arrive at a correct classification, and hence, a resolution, based on determining the transitive relationships from matching the dialogues. Further, the accuracy of dialogue classification may be improved.

As an illustrative, non-limiting example, a user may use a user device 210 to access a support application or service hosted by the agent device 220, and provide an initial phrase or utterance of: "I am locked out and need password assistance." The agent device 220 may apply natural language processing and initially classify the user input as a password issue. The agent device 220 may access a question map that identifies follow-up questions to ask based on the processed user input and/or classification. As an example, the agent device 220 may ask follow-up questions that identify more specifically which system in which the user is locked out. For example, the agent device 220 may ask a series of follow-up questions to determine whether the user is locked out of an e-mail system, share drive system, virtual private network (VPN) system, hard drive encryption screen, etc. The agent device 220 may score the user's responses to determine which follow-up questions are considered relevant (e.g., lead to a resolution of the user's issue). The dialogue may be graphed in the manner discussed above, and saved for future comparisons with other dialogues.

As other similar dialogues are saved with other users, the agent device 220 may compare these dialogues and determine transitive relationships between the dialogues to shorten or streamline the line of questions needed to arrive at the solution to the user's issue. In the above example, the agent device 220 may determine, over a period of time from saving and tracking multiple different dialogues, that when a user initially asks for password assistance, the user is likely asking for password assistance relating to accessing a company e-mail account. Accordingly, the agent device 220 may update the question map so that fewer follow-up questions are needed to arrive at a solution for the user. It is emphasized that the above is merely an example implementation, and aspects of the present invention may be applied to any number of situations or support issues in which transitive relationships between dialogues can be determined to streamline future dialogues and improve classification accuracy.

Figure 5:
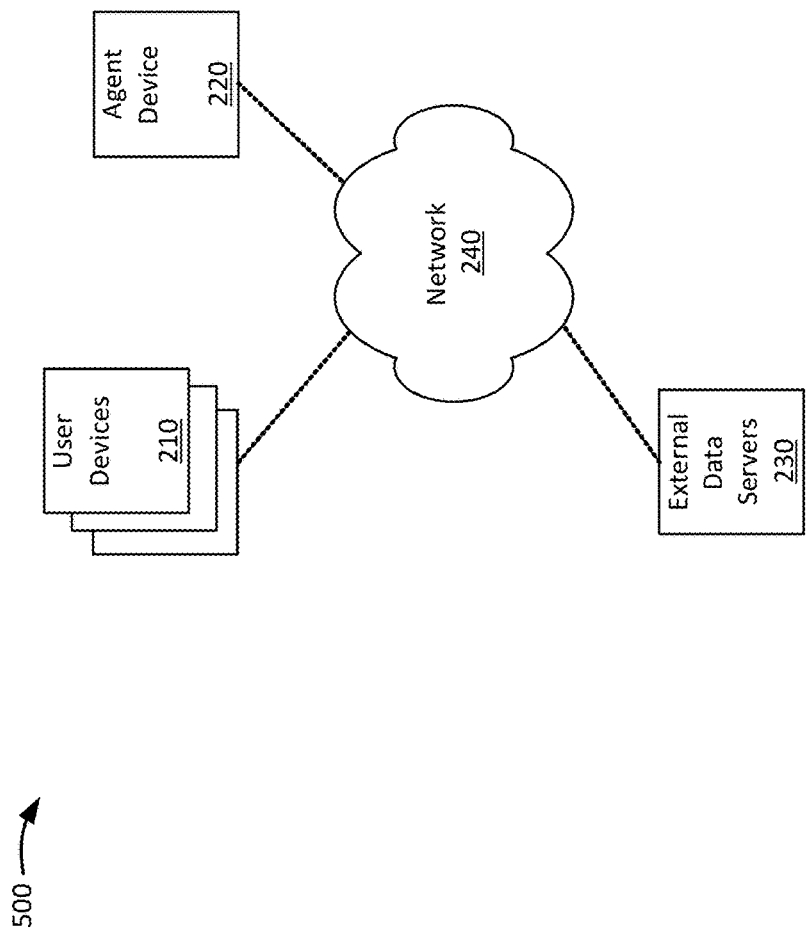
FIG. 5 shows an example environment in accordance with aspects of the present invention.

FIG. 5 shows an example environment in accordance with aspects of the present invention. As shown in FIG. 5, environment 500 may include user devices 210, an agent device 220, external data servers 230, and a network 240. In embodiments, one or more components in environment 500 may correspond to one or more components in the cloud computing environment of FIG. 2. In embodiments, one or more components in environment 500 may include the components of computer system/server 12 of FIG. 1.

A user device 210 may include a device capable of communicating via a network, such as the network 240. For example, the user device 210 may correspond to a mobile communication device (e.g., a smart phone or a personal digital assistant (PDA)), a portable computer device (e.g., a laptop or a tablet computer), a desktop computer, or another type of device. In some embodiments, the user device 210 may be used to access an automated support application or service hosted by the agent device 220. The user device 210 may include a user interface to receive user inputs to the agent device 220 and receive responses from the agent device 220 as part of a support dialogue.

The agent device 220 may include one or more computing or server devices (e.g., such as computer system/server 12 of FIG. 1) that host an automated support application or service accessible by the user device 210. The agent device 220 may receive user inputs from the user device 210 that identify the user and relate to a support issue with which the user is seeking assistance. The agent device 220 may host a dialogue with the user via the user device 210, apply natural language processing to determine the intent of the dialogue, ask follow-up questions based on a question map, classify the dialogue, generate a dialogue graph, store the dialogue, compare the dialogue with other dialogues to determine transitive relationships, and streamline or update the question map to shorten or streamline future dialogues and improve the accuracy of dialogue classification. In embodiments, the agent device 220 may communicate with one or more external data servers 230 to obtain user information and/or other information (e.g., from web sources using searching techniques) that may be used to assist the user resolving a support issue.

The external data servers 230 may include one or more computing or server devices (e.g., such as computer system/server 12 of FIG. 1) that store information that may be used to assist the user resolving a support issue. For example, the external data servers 230 may include user or employee information databases that identify user accounts, services, applications, domains, etc. that a user may have permission to access. As an illustrative example, the agent device 220 may query the external data server 230 to determine domains or directories that the user has permission to access, as this information may be pertinent when resolving a user support issue. Additionally, or alternatively, the external data servers 230 may include web servers that host any variety of webpages, applications, social media platforms, or the like, which may be accessed to provide the user with any variety of information to resolve the user's support issue.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
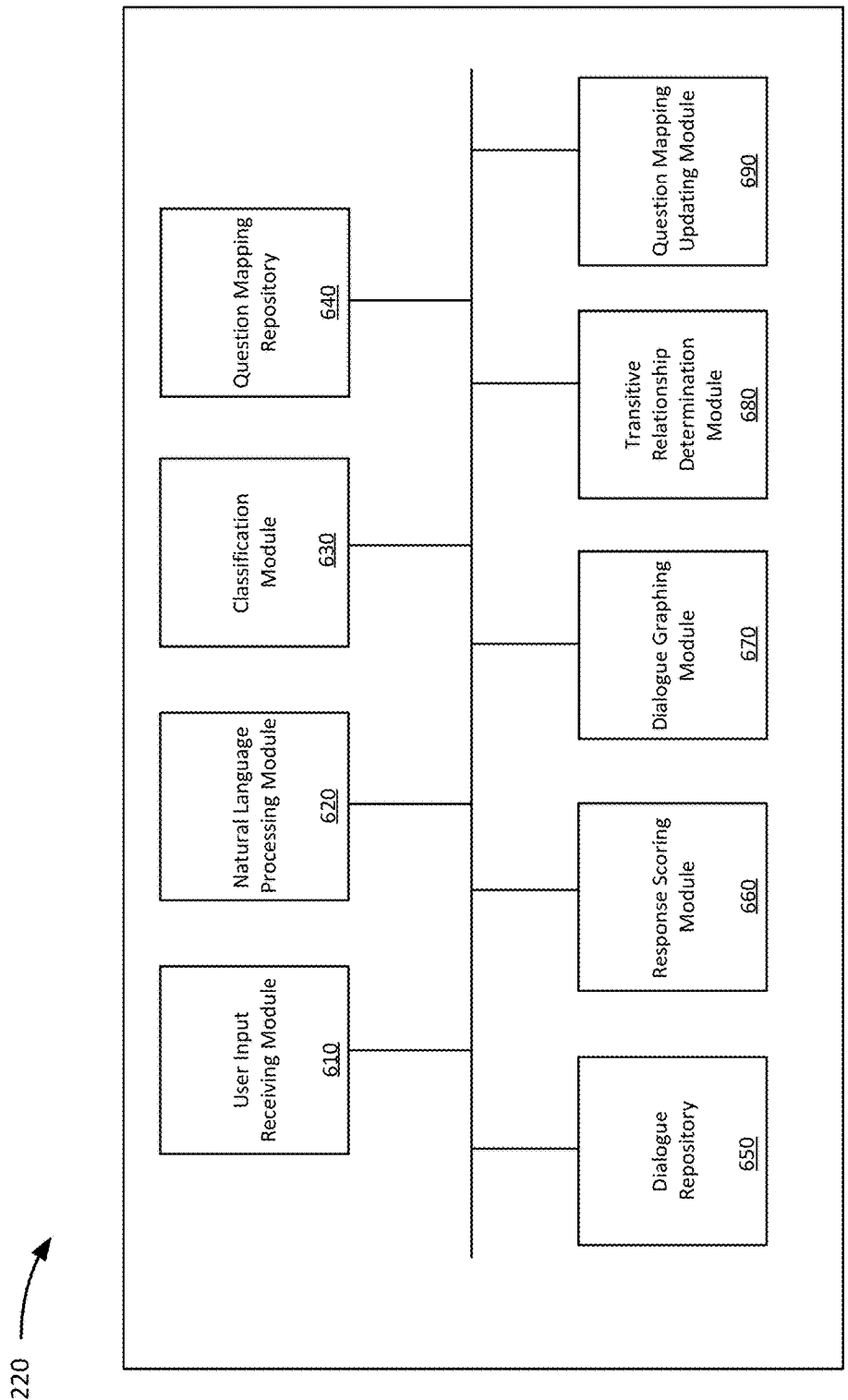
FIG. 6 shows a block diagram of example components of an agent device in accordance with aspects of the present invention.

FIG. 6 shows a block diagram of example components of an agent device 220 in accordance with aspects of the present invention. As shown in FIG. 6, the agent device 220 may include a user input receiving module 610, a natural language processing module 620, a classification module 630, a question mapping repository 640, a dialogue repository 650, a response scoring module 660, a dialogue graphing module 670, a transitive relationship determination module 680, and a question mapping updating module 690. In embodiments, the agent device 220 may include additional or fewer components than those shown in FIG. 6. In embodiments, separate components may be integrated into a single computing component or module. Additionally, or alternatively, a single component may be implemented as multiple computing components or modules.

The user input receiving module 610 may include a program module (e.g., program module 42 of FIG. 1) that receives user input from the user device 210. More specifically, the user input receiving module 610 may receive user input via an automated support application hosted by the agent device 220. The user input may include an initial request for support assistance, and responses to follow-up questions presented by the agent device 220.

The natural language processing module 620 may include a program module (e.g., program module 42 of FIG. 1) that applies natural language processing techniques to user input received via the user input receiving module 610. In embodiments, the natural language processing module 620 may apply any suitable computer-based natural language processing technique which may be used to automatically classify and/or determine intent of the user input (e.g., as described below with respect to the classification module 630).

The classification module 630 may include a program module (e.g., program module 42 of FIG. 1) that classifies user inputs. In embodiments, the classification module 630 may determine an initial classification based on the user's first phrase or utterance. The classification module 630 may reclassify a dialogue throughout the duration of the dialogue. The classification module 630 may classify or reclassify user inputs based on natural language processing performed by the natural language processing module 620. In embodiments, the classification module 630 may apply sub-classifications to the user inputs to better identify the user's intent. If a dialogue cannot be classified, the classification module 630 may provide an indication that the user input cannot be classified such that follow-up questions can be asked in order to classify the dialogue. In embodiments, the classification module 630 may confirm that a classification is correct based on user responses indicating that the classification is correct. For example, the classification module 630 may output information indicating the classification or intent behind the dialogue, and the user may provide user input to confirm that the classification is correct.

The question mapping repository 640 may include a data storage device (e.g., storage system 34 of FIG. 1) that stores a data structure that maps follow-up questions to ask a user based on the user's inputs and classification of those inputs (e.g., the classifications as determined by the classification module 630). For example, the follow-up questions may include questions that may confirm the classification, and/or questions that ask more specific questions to better classify or sub-classify the dialogue. As described herein, the question maps stored by the question mapping repository 640 may be updated to remove non-relevant question paths.

The dialogue repository 650 may include a data storage device (e.g., storage system 34 of FIG. 1) that stores dialogues between users and the agent device 220 through the automated support application. In embodiments, the dialogue repository 650 may store chat or text transcripts and/or dialogue graphs for each dialogue, which may be used to match dialogues to determine transitive relationships, as described herein.

The response scoring module 660 may include a program module (e.g., program module 42 of FIG. 1) that scores user responses and inputs to questions presented by the agent device 220. In embodiments, the response scoring module 660 may score user responses (e.g., received by the user input receiving module 610) based on level of relevance to which the responses lead to a resolution to a user support issue. For example, if a user response to a question leads to a correct classification or sub-classification of the dialogue, that user response may be scored relatively highly, whereas if a user response to a question does not lead to a correct classification or sub-classification of the dialogue, at user response may be scored relatively low. As described herein, the scores may be used to prune question mappings and/or question lists and reduce the number of questions and interactions needed to arrive at a correct classification and solution to a user's issue.

The dialogue graphing module 670 may include a program module (e.g., program module 42 of FIG. 1) that graphs a dialogue. An example of a dialogue graph is shown in FIG. 4B. As described herein, the dialogue repository 650 may store dialogue graphs, and the dialogue graphs may be used to determine transitive relationships between dialogues (e.g., by the transitive relationship determination module 680 as described herein).

The transitive relationship determination module 680 may include a program module (e.g., program module 42 of FIG. 1) that may compare stored dialogues with each other (e.g., dialogues stored by the dialogue repository 650) to determine transitive relationships between the dialogues, and more specifically, determine transitive relationships between specific nodes within the dialogue graphs (e.g., as generated by the dialogue graphing module 670). Further, the transitive relationship determination module 680 may determine transitive relationships based on commonalities between text transcripts of different dialogues. In embodiments, the transitive relationship determination module 680 may determine that one node in a dialogue graph (e.g., a first phrase, or one of the first phrases in a dialogue) is transitively related to a particular solution (e.g., a later node in the dialogue graph). In embodiments, comparison of the dialogue graph may prevent situations in which similar dialogues are incorrectly matched such that only dialogues that are similar to a particular degree are matched for determining transitive relationships. For example, dialogue graphs that have similar ending classifications and outcomes may be matched, and those dialogue graphs may be compared to identify correct and accurate transitive relationships. In turn, the "shortest path" between nodes (e.g., the shortest dialogue to reach a resolution) can be determined.

The question mapping updating module 690 may include a program module (e.g., program module 42 of FIG. 1) that updates question mappings stored by the question mapping repository 640. In embodiments, the question mapping updating module 690 may update the question mappings based on the transitive relationships determined by the transitive relationship determination module 680. In embodiments, the question mapping updating module 690 may eliminate nodes (e.g., questions) in a dialogue graph such that the path between an initial utterance and a final resolution is shortened. In other words, the question mapping updating module 690 may eliminate non-relevant lines of questions that do not lead to a solution to the user's support issue. Further, the question mapping updating module 690 may eliminate non-relevant lines of questions based on the scores to user responses as determined by the response scoring module 660. Additionally, or alternatively, the question mapping updating module 690 may abridge merged text transcripts of transitively related dialogues to include only the relevant portions of text that lead to a solution to the user's support issue. For example, the question mapping updating module 690 may generate an abridged text transcript that includes the text from the transitively related dialogues but with the non-relevant portions from each transitively related dialogue excised or removed. In embodiments, the abridged text transcript may be used as a "road map" or guide for future dialogues such that future dialogues only include relevant questions that lead to a solution to a user's support issue.

Figure 7A:
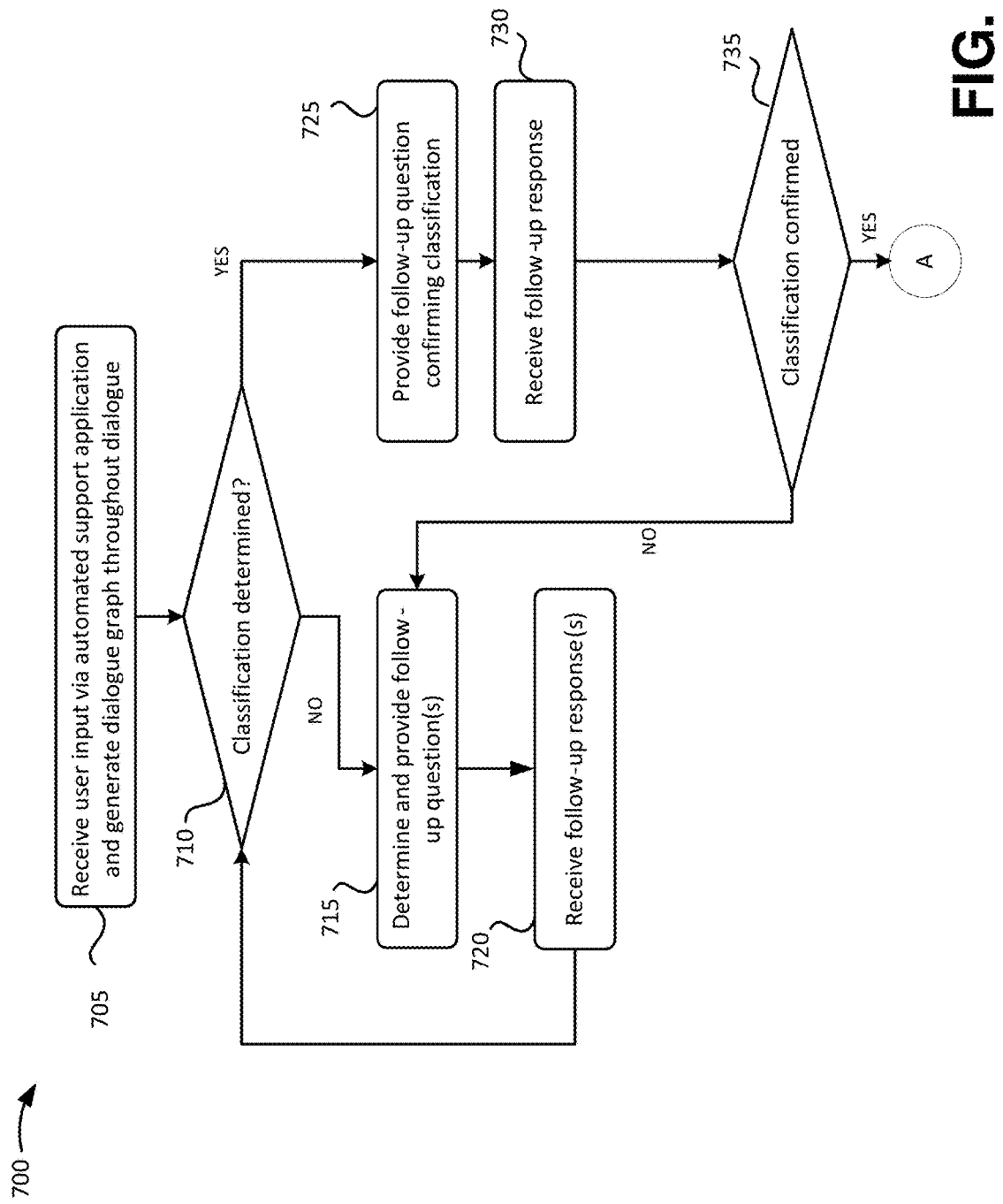
FIGS. 7A and 7B show an example flowchart for determining transitive relationships between dialogues to streamline future dialogues in accordance with aspects of the present invention.
Figure 7B:
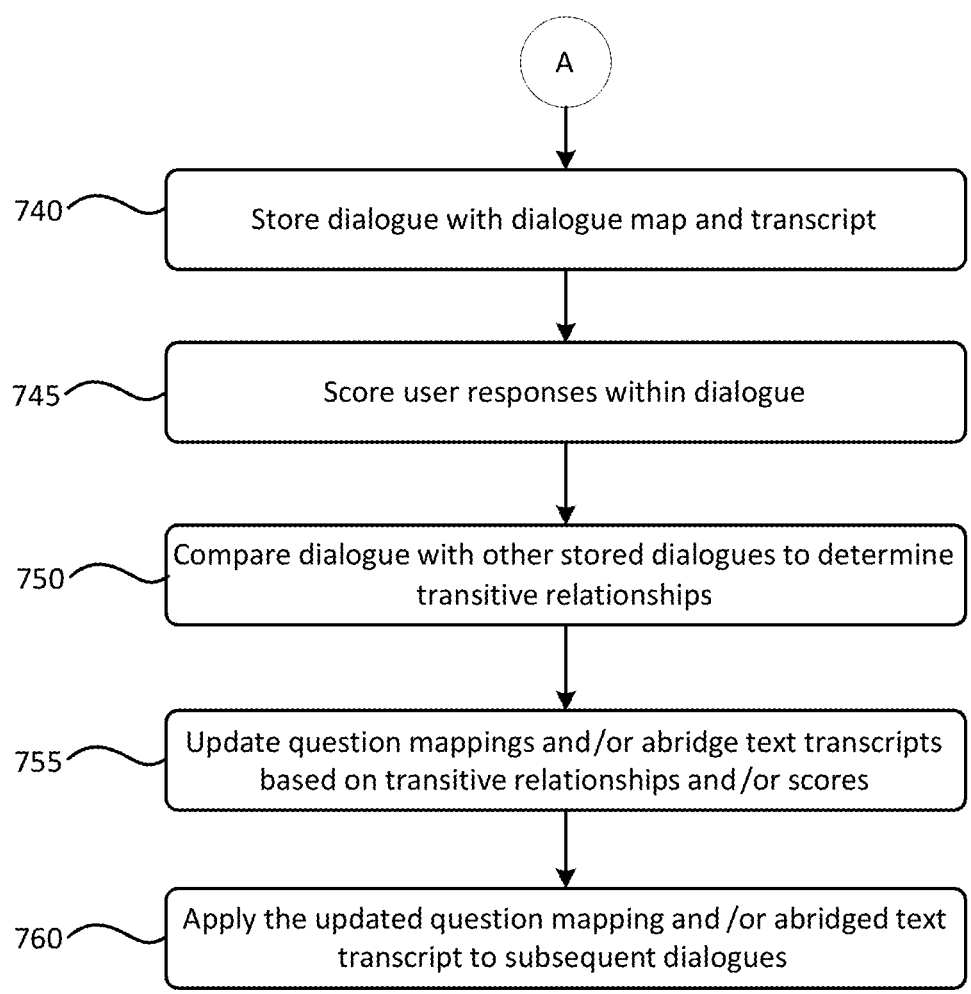

FIGS. 7A and 7B show an example flowchart of a process for determining transitive relationships between dialogues to streamline future dialogues. The steps of FIGS. 7A and 7B may be implemented in the environment of FIG. 5, for example, and are described using reference numbers of elements depicted in FIGS. 5 and 6. As noted above, the flowchart illustrates the architecture, functionality, and operation of possible implementations of systems, methods, and computer program products according to various embodiments of the present invention.

As shown in FIG. 7A, process 700 may include receiving user input via an automated support application and begin generating a dialogue graph through the dialogue (step 705). For example, as described above with respect to the user input receiving module 610, the agent device 220 may user input from the user device 210. More specifically, the agent device 220 may receive user input via an automated support application hosted by the agent device 220. The user input may include a request for support to resolve a support issue. Throughout process 700, the agent device 220 may generate and update a dialogue graph (e.g., using the dialogue graphing module 670) as the dialogue between the user via the user device 210 and the agent device 220 progresses with questions, answers, and classification determinations as described herein.

Process 700 may also include determining whether the user input can be classified (step 710). For example, as described above with respect to the natural language processing module 620 and the classification module 630, the agent device 220 may apply natural language processing to the user input to classify the user input.

If, for example, the user input cannot be classified (step 710-NO), process 700 may further include determining and providing follow-up questions (step 715). For example, as described above with respect to the question mapping repository 640, the agent device 220 may determine follow-up questions based on a question map stored by the question mapping repository 640. The follow-up question may be based on natural language processing and a "best guess" of a classification or intent of the user's input, as well as the words included in the user input. The follow-up question may be provided in order to determine the classification for the dialogue.

Process 700 may also include receiving follow-up responses (step 720). For example, as described above with respect to the user input receiving module 610, the agent device 220 may receive responses from the user device 210 to the follow-up questions. Process 700 may return to step 710 where the agent device 220 attempts to classify the dialogue based on the response to the follow up questions.

If, at step 710, a classification is determined (step 710— YES), process 700 may further include providing follow-up questions to confirm the classification (step 725). For example, as described above with respect to the question mapping repository 640, the agent device 220 may determine follow-up questions based on determining the classification. The follow-up questions may ask the user to confirm the classification, or may include a resolution to the user's support issue with a request to conform that the resolution has resolved the user's support issue.

Process 700 may also include receive a follow-up response (step 730). For example, as described above with respect to the user input receiving module 610, the agent device 220 may receive a response from the user device 210 to the follow-up question.

Process 700 may further include determining whether the classification has been confirmed, (step 735). For example, as described above with respect to the classification module 630, the agent device 220 may confirm whether the classification is correct based on the user response to the follow-up question.

If, for example, the classification is not confirmed (step 735-NO), process 700 may return to step 715 where follow-up questions are determined to re-classify the dialogue. As described herein, agent device 220 may store the classification at a corresponding node in the dialogue graph as the dialogue is classified and reclassified.

If, on the other hand, the classification is confirmed (step 735—YES), and as shown in FIG. 7B, process 700 may include storing the dialogue with the dialogue graph and transcript (step 740). For example, as described above with respect to the dialogue repository 650, the agent device 220 may store the dialogue transcript and graph in the dialogue repository 650.

Process 700 may further include scoring the user responses within the dialogue (step 745). For example, as described above with respect to the response scoring module 660, the agent device 220 may score the user responses based on level of relevance to which the responses lead to a resolution to a user support issue. In embodiments, the agent device 220 may score the user responses by analyzing the dialogue graph and the paths within the dialogue graph to determine which user responses lead to a correct classification of the dialogue.

Process 700 may further include comparing the dialogue with other stored dialogues to determine transitive relationships (step 750). For example, as described above with respect to the transitive relationship determination module 680, the agent device 220 may compare stored dialogues with each other to determine transitive relationships between the dialogues, and more specifically, determines transitive relationships between specific nodes within the dialogues. Further, the agent device 220 may determine transitive relationships based on abridging text transcripts of different dialogues. In embodiments, the transitive relationship determination module 680 may determine that one node in a dialogue graph (e.g., a first phrase, or one of the first phrases in a dialogue) is transitively related to a particular solution (e.g., a later node in the dialogue graph).

Process 700 may also include updating question mappings and/or abridge text transcripts based on the transitive relationships and/or scores (step 755). For example, as described above with respect to the question mapping updating module 690, the agent device 220 may update question mappings stored by the question mapping repository 640. In embodiments, the agent device 220 may update the question mappings based on the transitive relationships determined by the transitive relationship determination module 680. In embodiments, the agent device 220 may eliminate nodes (e.g., questions) in a dialogue graph such that the path between an initial utterance and a final resolution is shortened. In other words, the agent device 220 may eliminate non-relevant lines of questions that do not lead to a solution to the user's support issue. Further, the agent device 220 may eliminate non-relevant lines of questions based on the scores to user responses as determined by the response scoring module 660. Additionally, or alternatively, the agent device 220 may abridge text transcripts of transitively related dialogues to include only the relevant portions of text that lead to a solution to the user's support issue. In embodiments, the abridged text transcripts may be used as a "road map" or guide for future dialogues such that future dialogues only include relevant questions that lead to a solution to a user's support issue.

Process 700 may further include applying the updated question mapping and/or abridged text transcript to subsequent dialogues (step 760). For example, the updated question mappings and/or the abridged text transcript may be applied to future or subsequent support dialogues such that the future or subsequent support dialogues having similar user responses are shortened and streamlined to arrive at a solution to a user's support issue more quickly, and to more accurately classify the dialogue.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing, by a computing device, a plurality of dialogues between user devices and an automated support application hosted by the computing device;
   determining, by the computing device, transitive relationships between the plurality of dialogues; and
   updating, by the computing device, a question mapping based on the determining the transitive relationships; and
   applying, by the computing device, the updated question mapping to a subsequent support dialogue, wherein the storing the plurality of dialogues includes storing respective dialogue graphs associated with each of the plurality of dialogues, and the determining the transitive relationships includes matching a subset of the plurality of dialogues based on respective dialogue graphs of each of the subset of the plurality of dialogues.

2. The method of claim 1, wherein the updating the question mapping reduces a number of questions included in the question mapping.

3. The method of claim 1, wherein storing a dialogue graph of the respective dialog graphs comprises generating the dialogue graph, wherein the generating the dialogue graph comprises generating nodes representing responses by each of the user device and the automated support application and a path between the responses.

4. The method of claim 3, wherein the generating the dialogue graph further comprises storing indications of one or more classifications determined at each node in the graph.

5. The method of claim 3, wherein the nodes in the dialogue graph represent follow-up questions presented by the automated support application and responses to the follow-up questions.

6. The method of claim 1, wherein the determining the transitive relationships further comprises determining a shortest path between a node representing an initial utterance and a node representing a resolution.

7. The method of claim 1, further comprising scoring user responses within the plurality of dialogues, wherein the updating is further based on the scoring the user responses.

8. The method of claim 1, wherein a service provider at least one of creates, maintains, deploys and supports the computing device.

9. The method of claim 1, wherein the storing the plurality of dialogues, the determining the transitive relationships, the updating the question mapping, and the applying the updated question map are provided by a service provider on a subscription, advertising, and/or fee basis.

10. The method of claim 1, wherein the computing device includes software provided as a service in a cloud environment.

11. The method of claim 1, further comprising deploying a system for streamlining user support dialogues, comprising providing a computer infrastructure operable to perform the storing the plurality of dialogues, the determining the transitive relationships, the updating the question mapping, and the applying the updated question map.

12. A computer program product for streamlining support dialogues, the computer program product comprising a computer readable non-transitory storage medium having program instructions embodied therewith, the program instructions executable by a computing device to cause the computing device to:

receive, via an automated support application hosted by the computing device, an initial user input from a user via a user device;

provide one or more follow-up questions based on receiving the initial user input and a question mapping;

receive one or more follow-up responses to the one or more follow-up questions;

store a dialogue, wherein the dialogue includes the initial user input, the one or more follow-up questions, and the one or more follow-up responses;

determine a transitive relationship between the stored dialogue and one more previously stored dialogues;

update the question mapping based on the determining the transitive relationships; and apply the updated question mapping to a subsequent support dialogue, wherein the determining the transitive relationships includes comparing dialogue graphs associated with the stored dialogue and the one more previously stored dialogues.

13. The computer program product of claim 12, wherein the program instructions further cause the computing device to apply natural language processing to automatically determine one or more classifications of the dialogue at different points in the dialogue, wherein the storing the dialogue further includes storing the one or more classifications.

14. The computer program product of claim 12, wherein the program instructions further cause the computing device to score user responses within the dialogues, wherein the updating is further based on the scoring the user responses.

15. The computer program product of claim 12, wherein the program instructions further cause the computing device to:

abridge text transcripts associated with the stored dialogue and the one more previously stored dialogues that are transitively related; and apply the updated question mapping to the subsequent support dialogue.

16. A system comprising:

a CPU, a computer readable memory and a computer readable storage medium associated with a computing device;

program instructions to store a plurality of dialogues between user devices and an automated support application hosted by the computing device;

program instructions to determine transitive relationships between the plurality of dialogues; and program instructions to merge and abridge text transcripts of a subset of the plurality of dialogues that are transiently related to form an abridged text transcript; and program instructions to apply the abridged text transcript to a subsequent support dialogue, wherein the storing the plurality of dialogues comprises program instructions to store respective dialogue graphs associated with each of the plurality of dialogues, and the determining the transitive relationships comprises program instructions to match a subset of the plurality of dialogues based on respective dialogue graphs of each of the subset of the plurality of dialogues, and the program instructions are stored on the computer readable storage medium for execution by the CPU via the computer readable memory.

17. The system of claim 16, wherein the storing the plurality of dialogues comprises program instructions to generate a dialogue graph of respective dialog graphs associated with the plurality of dialogues, wherein the generating the dialogue graph comprises program instructions to generate nodes representing user responses and responses by the automated support application and a path between the user responses and the responses by the automated support application.

* * * * *